April 14, 1925.                                                            1,533,139
E. D. PUTT ET AL
MACHINE FOR TRIMMING RUBBER HEELS
Original Filed Jan. 23, 1919      3 Sheets-Sheet 1

Witness:

Inventors:
Edward D. Putt,
William C. Stevens.
By G. P. Ely
Atty.

April 14, 1925.  
E. D. PUTT ET AL  
MACHINE FOR TRIMMING RUBBER HEELS  
Original Filed Jan. 23, 1919   3 Sheets-Sheet 2
1,533,139
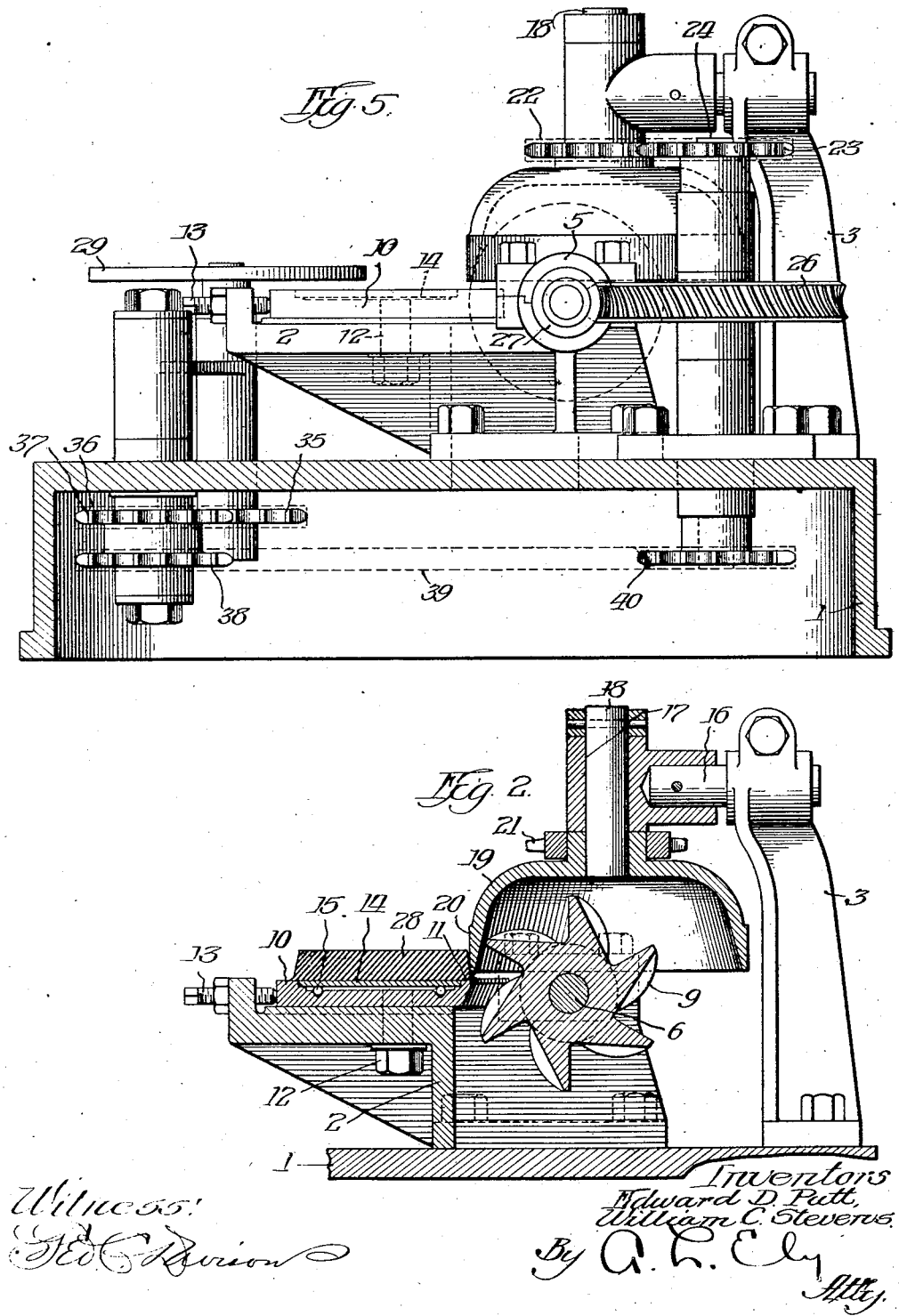

April 14, 1925.  
E. D. PUTT ET AL  
MACHINE FOR TRIMMING RUBBER HEELS  
Original Filed Jan. 23, 1919

Witness:  
Inventors:  
Edward D. Putt,  
William C. Stevens

Patented Apr. 14, 1925.

1,533,139

UNITED STATES PATENT OFFICE.

EDWARD D. PUTT AND WILLIAM C. STEVENS, OF AKRON, OHIO, ASSIGNORS, BY MESNE ASSIGNMENTS, TO UNITED SHOE MACHINERY CORPORATION, OF PATERSON, NEW JERSEY, A CORPORATION OF NEW JERSEY.

MACHINE FOR TRIMMING RUBBER HEELS.

Application filed January 23, 1919, Serial No. 524,293. Renewed December 22, 1921.

*To all whom it may concern:*

Be it known that we, EDWARD D. PUTT and WILLIAM C. STEVENS, citizens of the United States, residing at Akron, in the county of Summit, State of Ohio, have invented certain new and useful Improvements in Machines for Trimming Rubber Heels, of which the following is a specification.

This invention relates to cutting machines and is herein illustrated as embodied in a machine for trimming the fin or overflow from rubber heels to prepare them for incorporation in boots and shoes.

Such heels are made by placing blanks of unvulcanized rubber or rubber compound in molds and subjecting them to heat and pressure. During this treatment more or less of the rubber flows into the spaces between the parts of the mold so that the vulcanized heels have fins or rinds which must be trimmed off preparatory to incorporating the heels in boots and shoes.

A machine for successfully competing with hand work in the trimming of rubber heels and similar articles should be rapid, free from liability to cut into the heels and capable of trimming heels of the prevailing shapes.

According to one feature of the present invention, there is provided in cooperative relation with the cutter by which the fin is severed, a combined feed member and guard which contacts with the side of the heel or other article above the fin. This member acts to aid in feeding the work, and to protect both the work and the fingers of the operator from accidental injury by the cutter. In the illustrative machine, this member takes the general form of a bell which is rotated about a vertical axis and partly encloses a rotary cutter. The heel is presented with its side contacting with the bell and its projecting fin extending beneath the bell into the path of the cutter, and is thereafter manipulated to cause the fin to be trimmed off, the bell serving to facilitate the feeding of the heel and to prevent accidental injury both to the heel and to the fingers of the operator.

Other objects and advantages will appear as the description proceeds and changes and modifications may be made without departing from the spirit of the invention or sacrificing any benefits thereof.

It will be apparent that the machine forming the subject matter of this invention is capable of use for trimming a wide variety of objects other than rubber heels, although it is especially designed for that duty and such variations in design or use are within the scope of this invention and are intended to be covered hereby.

In the drawings accompanying this application:

Fig. 2 is a partial section on the line 2—2 of Fig. 1.

Fig. 5 is a side elevation of Fig. 4, a portion of the base being removed.

Figure 1:
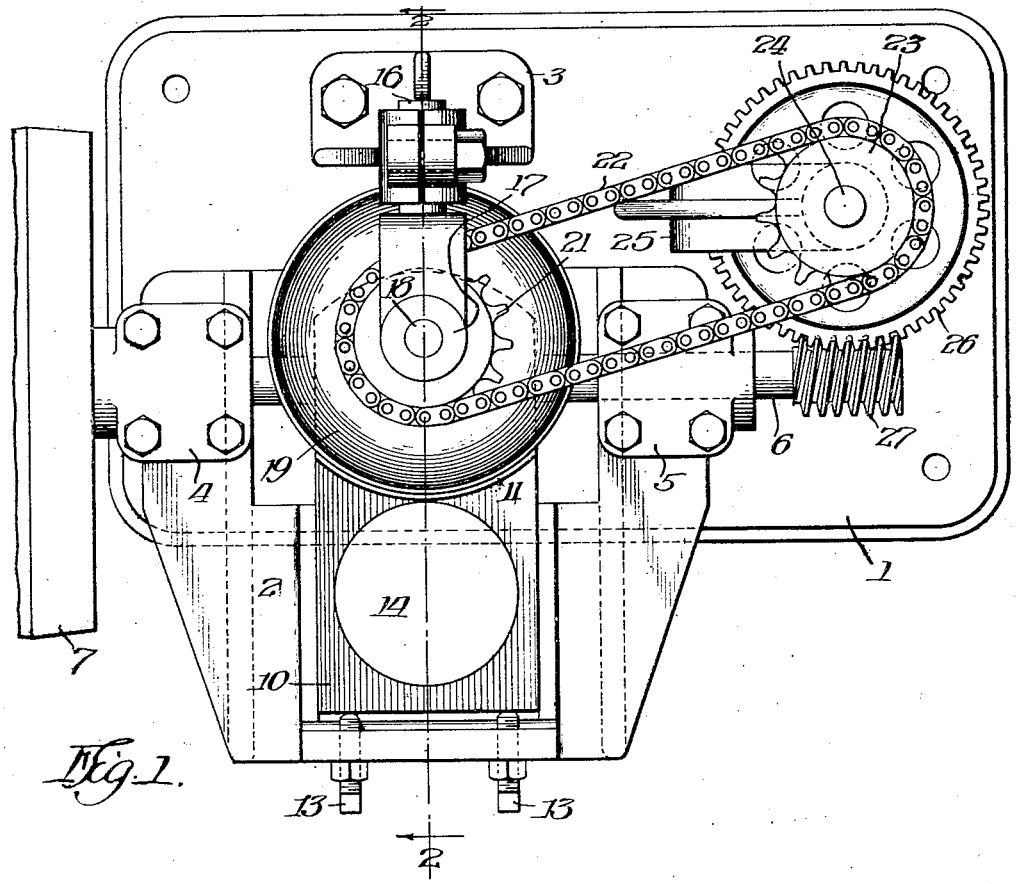
Fig. 1 is a plan view of a machine in which the present invention is embodied.
Figure 3:
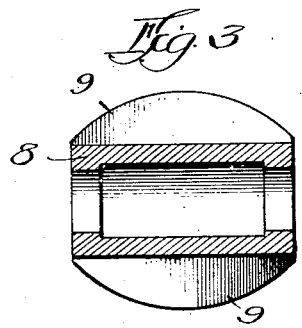
Fig. 3 is a longitudinal section through the trimming knife.

The machine comprises a base plate 1 to which is secured a housing 2 supporting the trimming knife and work carrying table. On top of the table are secured bearings 4 and 5, in which is mounted a longitudinal shaft 6, one end carrying a drive pulley 7. Located centrally of the shaft is a trimming knife 8. This knife may be in any form, but that preferred by me is approximately oval in shape, carrying a plurality of spiral knife blades 9. The front of the housing carries a work table 10, the forward edge of which is curved to co-operate with the knife and is provided with a cutting edge 11. The table is secured in any position of adjustment by a set screw 12, adjusting screws 13 being passed through the edge of the housing and bearing against the side of the table remote from its cutting edge.

Seated in a recess in the top of the table is a freely rotatable work supporting disk 14 on which the article is placed, under which ball bearings 15 may be located.

Extending from the upper end of the standard 3 is a lateral pin 16 on the end of which is secured a bearing 17 rotatably receiving a shaft 18. The lower end of shaft 18 carries a bell-shaped shield or guard 19 which covers the rotary knife, the lower edge of the bell passing close to and paralleling the edge 11, but leaving a sufficient gap for the passage of the heel rind. Around its lower end, the bell is provided with cylindrical bearing surface 20, against which the edge of the heel is pressed by the operator.

The bell is arranged to be rotated at a comparatively slow rate of speed by means of a sprocket 21 secured to its upper end, which sprocket is driven by a chain 22 from a second sprocket wheel 23. The latter is carried and rotated by a vertical shaft 24 mounted on a bracket 25, the shaft obtaining rotary motion from a worm gear 26 meshing with a worm 27 on the main shaft 6.

When the machine is being operated, the knife 9 and shield 19 are in constant rotation. The operator places the rubber heel 28, or other article to be trimmed, on the turn table or disk 14, passing the rind through the gap between the lower edge of the bell and the cutting edge 11, and holding the side of the heel against the surface 20. The rotation of the bell causes the heel to advance, and the disk 14 allows it to turn until its entire edge is trimmed. A light pressure on the top of the heel by the hand of the operator will cause it to bear against the bell and will assist in presenting the entire edge of the heel to the action of the knife. Both edges of the heel may be quickly and easily trimmed, and the work will be done more neatly than it is possible to do it by hand.

Figure 4:
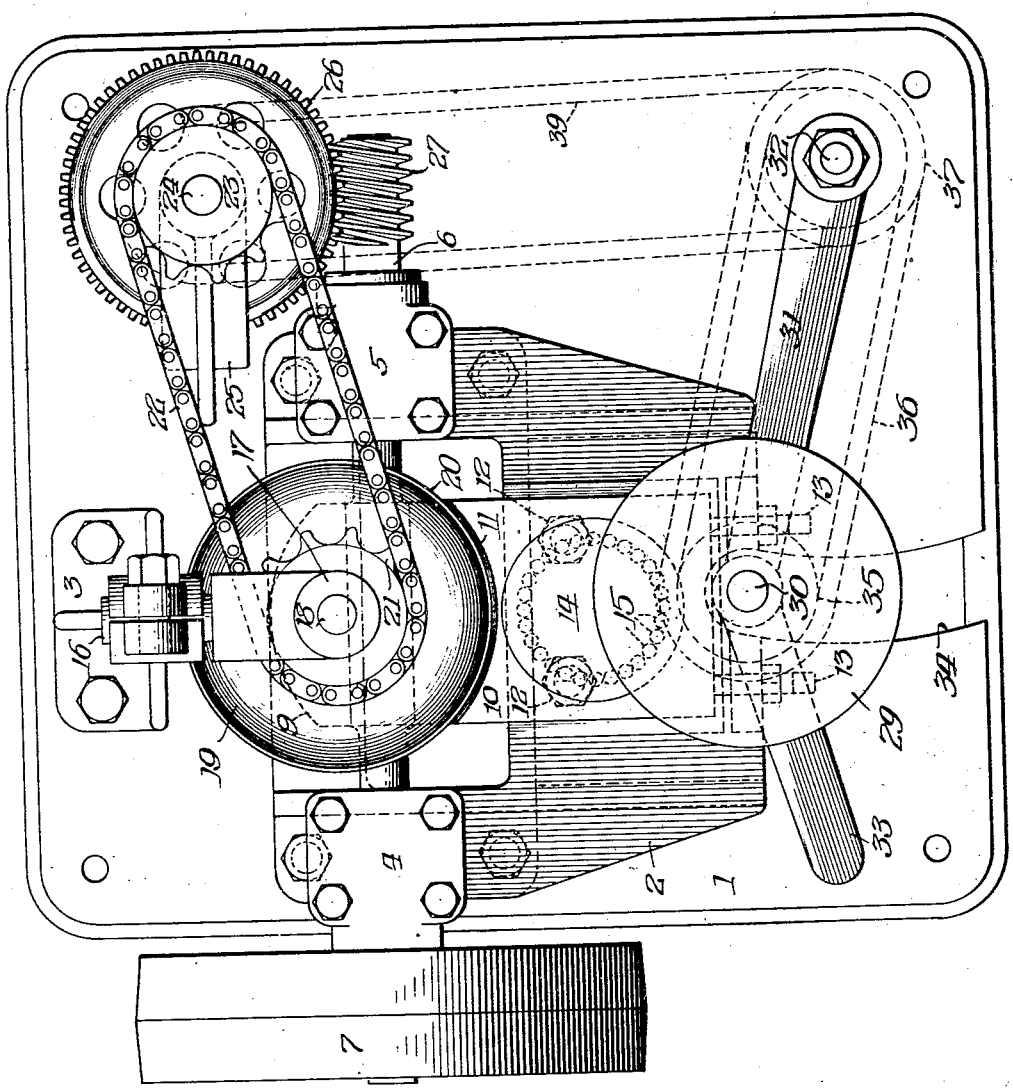
Fig. 4 is a plan view of a modification in which is provided a pressure wheel for holding the article in position.

In the modification shown in Figs. 4 and 5, we mount a pressure roller 29 on a traveling shaft 30, which roller bears against the side of the article opposite the bell 19. The shaft 30 is carried on a swinging arm 31 pivoted at 32 and provided with a handle 33 by which it may be moved in and out. An arc shaped slot 34 is provided in the table which permits the shaft to move in and out. The shaft 30 carries a sprocket 35 driven by a chain 36 from a second sprocket 37 located at the pivot of the arm 31. The sprocket 37 is united to a similar sprocket 38, which is driven by a chain 39 and sprocket 40 on the lower end of the shaft 24.

In this form of the invention the article to be trimmed is placed on the turntable 14 between the roller 29 and the bell 19 and firmly held by pressure on the lever 33. The movement of the bell and the roller causes the article to be fed to the knife and turned about as necessary.

The machine shown in this application is particularly suitable for trimming rubber heels or other articles of an irregular shape, although not limited to such use alone. Details which have been shown are not essential and the apparatus may be altered within range of the appended claims without departing from the invention.

We claim:

1. A machine for trimming a fin from a molded rubber heel or similar article having, in combination, a rotary cutter, a cooperating shear member, a thin-edged rotatable guard having its work-engaging portion extending in front of the cutter and located close to said cutter, whereby a face of the article may be held against the guard and so fed as to cause the fin to be severed substantially flush with said face, and means for rotating the guard to facilitate feeding the article.

2. A machine for trimming a fin from a molded rubber heel or similar article having, in combination, a rotary cutter, a cooperating shear member, a thin-edged rotatable guard in the form of a bell having its work-engaging portion extending in front of the cutter and located close to said cutter, whereby a face of the article may be held against the guard and so fed as to cause the fin to be severed substantially flush with said face, and means for rotating the guard to facilitate feeding the article.

3. A machine for trimming a fin from a molded rubber heel or similar article having, in combination, a rotary cutter, a thin-edged rotatable guard having its work-engaging portion extending in front of the cutter and located close to said cutter, a work support extending close to the operative edge of the cutter whereby the article may be placed upon the work support with a face held against the guard and so fed as to cause the fin to be severed substantially flush with said face, and means for rotating the guard to facilitate feeding the article.

4. A machine for trimming a fin from a molded rubber heel or similar article having, in combination, a rotary cutter, a work support adapted to support the article with the fin projecting into the path of the cutter, a thin-edged, hollow, rotatable guard extending over the cutter and having its operative, article-engaging portion located close to said cutter, whereby a face of the article may be held against the guard and the article moved so as to cause the fin to be severed close to the edge of said face, and means for rotating the guard to facilitate feeding the article.

5. In a machine for trimming rubber heels, a rotary trimming knife having spiral blades, means for rotating said knife a movable heel supporting disk, a bell suspended over the knife having a bearing surface at its lower edge against which the side of the heel may be pressed and means for rotating the bell.

6. A machine for trimming articles having a rind or projecting edge, comprising a table provided with a cutting edge, a knife adapted to cooperate with said cutting edge, a circular shield over the knife, the lower edge of said shield being spaced from the edge of the table providing a narrow slot through which the edge of the article to be trimmed may project, and means for rotating the shield.

7. A machine for trimming articles having a rind or projecting edge, comprising a table provided with an arc shaped cutting edge, a knife at the rear of said cutting edge, said knife being curved to fit said edge, a circular shield over said knife, the lower edge of the shield being spaced from the edge of the table to provide a slot, and means for rotating the shield.

8. A machine for trimming articles having a rind or projecting edge comprising a stationary table provided with a cutting edge, a knife at the rear of the cutting edge, a circular shield over the knife, the lower edge of said shield being spaced from the edge of the table to provide a narrow slot through which the edge of the article to be trimmed may project, means for rotating the shield and a rotatable work supporting disk in said table.

9. A machine for trimming articles having a rind or projecting edge, comprising a table provided with an arc shaped cutting edge, a knife at the rear of said cutting edge, said knife being curved to fit said edge, a circular shield over said knife, the lower edge of the shield being spaced from the edge of the table to provide a slot, means for rotating the shield, and a rotatable work supporting disk set into said table.

10. In a machine for trimming rubber heels or similar articles, a knife, a rotatably mounted shield over the knife, a work support in front of said shield and means located on said work support to facilitate shifting of the article to present its entire outer surface to the shield.

11. In a machine for trimming rubber heels or similar articles, a rotary knife, a rotatably mounted shield over said knife, a work table in front of said shield and a revolving support in said work table on which the articles rest while held in contact with said shield.

12. In a machine for trimming rubber heels or similar articles, a knife, a rotatably mounted shield over the knife, means for rotating the shield, a work support in front of said shield and means located on said work support to aid in shifting the article to present all of its edges to the knife.

13. In a machine for trimming rubber heels or similar articles, a rotary knife, a rotatably mounted shield over the knife, means for rotating the shield, a work table in front of said shield, a revolving support in said work table on which the articles rest while held in contact with the shield.

14. A machine for trimming the rind or fin from a face of a rubber heel having, in combination, a cutter, means for operating the cutter, a work support upon which a heel may be placed with its fin projecting into the path of the cutter in such manner that it will be severed flush with said face, a feed member adapted to contact with the side face of the heel above the fin, and means for operating said member.

15. A machine for trimming the rind or fin from a face of a rubber heel having, in combination, a cutter, means for operating the cutter, a work support, a hollow shield partly covering the cutter and having an edge extending in front of the cutter and spaced from the work support, the construction and arrangement being such that the base of the fin close to the face from which it projects lies in the path of the cutter, and means for rotating the shield.

16. A machine for trimming the rind or fin from a rubber heel or similar article having, in combination, a turn table to support the article, a cutter, means for operating the cutter, a shield overhanging the cutter and adapted to engage a locality on a side of the article, means for rotating the shield, a pressure roller adapted to engage a side of the article at a point opposite that engaged by the shield, and means for rotating the pressure roller.

17. A machine for severing a sheet-like portion which projects from a face of an article having, in combination, a support for the article, a rotary cutter, a thin-edged member having its work-engaging portion extending in front of the cutter, the space above the work support being free and unobstructed to permit the article to be moved over the support with the face from which the projecting portion extends in contact with the thin-edged member and with the projecting portion in position to be severed substantially flush with the face from which it projects, and means for rotating the guard.

EDWARD D. PUTT.
WILLIAM C. STEVENS.